C. ELLIS.
HYDROGEN GENERATION.
APPLICATION FILED JUNE 6, 1913.
1,173,417.
Patented Feb. 29, 1916.
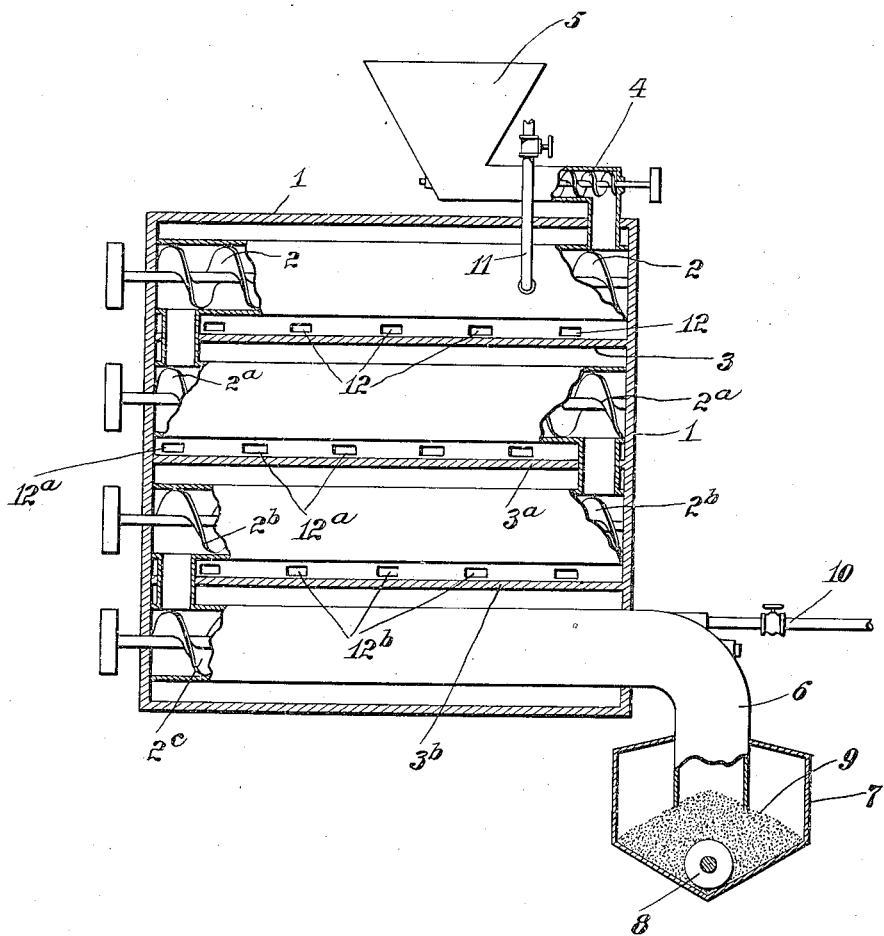
Attest:
O. Mitchell
R. Richardson
Inventor:
Carleton Ellis

UNITED STATES PATENT OFFICE.

CARLETON ELLIS, OF MONTCLAIR, NEW JERSEY.

HYDROGEN GENERATION.

1,173,417.  Specification of Letters Patent.  Patented Feb. 29, 1916.

Application filed June 6, 1913. Serial No. 772,049.

*To all whom it may concern:*

Be it known that I, CARLETON ELLIS, a citizen of the United States, and a resident of Montclair, in the county of Essex and State of New Jersey, have invented certain new and useful Improvements in Hydrogen Generation, of which the following is a specification.

This invention relates to a method of making hydrogen and relates in particular to a process involving the treatment of lime or lime-material with carbon monoxid, or carbon monoxid containing gases; or carbon material such as oil vapors and the like, capable under certain circumstances, of producing carbon monoxid.

When carbon monoxid is passed over hydrated lime or carbon monoxid mingled with steam is passed over quick lime, the latter being heated to a temperature of 450–600° C.; the monoxid takes oxygen from the water vapor forming carbon dioxid and liberating hydrogen, the carbon monoxid combining with the lime to form calcium carbonate. This action is accelerated by the presence of catalytic material such as iron oxid and manganese oxid. The reaction produces heat or is exothermic so that when once the mass of lime has been brought to the reacting temperature, sufficient heat often is developed for continuance of the operation without the aid of externally applied heat. In fact cooling may sometimes be required as the reaction does not progress with as good yields when the temperature is much above 525 or 550° C. Another consideration in this connection is the use of an excess of steam which greatly improves the yield of the hydrogen and greatly decreases the residue of any carbon monoxid.

Preferably 4 to 5 times as much water vapor by volume as carbon monoxid should be present in order to effect the desired substantially complete conversion. Difficulties are experienced in treating lime with gases to insure satisfactory absorption of the carbon dioxid, and it is desirable to remove the carbon dioxid as fast as it is formed in order to prevent by mass action the repression of the reaction due to the accumulation of the carbon dioxid in the gaseous atmosphere.

To carry out the conditions required for the reaction as specified, and to practise the present invention in its preferred embodiment, I make use of the illustrative apparatus diagrammatically depicted in the accompanying drawing which shows mainly in vertical section a treating apparatus comprising a series of superimposed conveyers; a portion of the conveying conduits being shown in elevation.

In the drawings 1 is a furnace wall supporting a series of conveying conduits equipped with spiral conveyers or similar conveying devices, these being shown at 2, $2^a$, $2^b$ and $2^c$. These conveyers are connected by chutes so that material entering the upper conveyer feeds downwardly conveyer by conveyer until it passes from the lower section.

3, $3^a$ and $3^b$ are partitions or baffles separating more or less the several conveyer sections and enabling differing temperatures if desired to be maintained in different sections.

4 is a small feeding conveyer connecting with the supply hopper 5 at one end and communicating at the other end with the conveyer 2.

6 is an outlet pipe from $2^c$ communicating with the receptacle 7 having the discharging conveyer 8. The material collecting in the receptacle 7 is shown at 9.

10 is an inlet for water-gas or other gas or vapor and 11 is an exit for such gases.

12 is a port through which combustible gases for heating purposes or heated products of combustion may be introduced to raise the temperature of the sections to the requisite degree. $12^a$ and $12^b$ are similar ports. Through these ports cold air may also be admitted in order to cool the vapors in case the temperature becomes excessive.

The operation of the apparatus is as follows: The lime material is placed in the hopper 5 and is fed by the conveyer 4 into the conveyer 2, traveling along the conveyer 2 and passing into the conveyer $2^a$, then into $2^b$ and $2^c$ and finally discharging into the receptacle 7. By means of the pipe 10 a mixture, for example, of water-gas and steam preferably in the proportion of 1 part of water-gas to from 2–2½ parts of steam is introduced and this mixture may be preheated if desired. The gaseous mixture and vapors pass over the lime material discharging from the section $2^c$ and become preheated to the reacting temperature so that at least by the time they have entered the section $2^b$, preferably they are heated to the required reacting temperature which is approximately 500° C. The gas or vapor mixture passes from section to section in contact with lime material which is being constantly but slowly moved forward in a direction opposite to the flow of the gases or vapors and in this manner the carbon monoxid uniting with the oxygen of the water forms carbon dioxid which combines with the lime, removing the carbon dioxid as such from the scene of the reaction and enabling a further conversion of carbon monoxid into carbon dioxid, so that the gases discharging from the upper section of the conveyer may be practically pure hydrogen or hydrogen containing only a small measure of contaminating products.

The lime which is employed for the operation preferably is as low in magnesia, as dolomite and other high magnesia limes are not as desirable for this purpose. Preferably the lime should be finely divided which may be accomplished by grinding same, or the lime may be introduced in the hydrated form as a dry powder. In any event the addition of 5% or so of finely divided iron or manganese oxid is desirable as promoting the reaction in a very large measure. The iron or manganese oxid preferably is derived by precipitation as a hydrate from aqueous solution and washing and drying the product.

The carbonated lime discharging into the receptacle 7 is removed by the conveyer 8 and preferably passed through a rotary kiln which may be heated by a producer gas or a powdered coal flame, and the lime regenerated, care being taken preferably to not overheat the iron or manganese oxid to such an extent that its preferred amorphous condition is lost so that it does not effect as rapid catalysis. The regenerated lime, especially if not over-heated, may be used again and again.

In place of carbon monoxid or water gas, producer gas, etc., the vapors of oil, for example, may be mingled with steam and passed over the lime to effect decomposition, thereby liberating hydrogen both from the oil and the water, forming first carbon monoxid and then carbon dioxid which is absorbed by the lime. Or other alkali such as caustic soda or soda lime may be used, or formates or oxalates also obtain under certain circumstances.

To recapitulate, my invention relates to the process of making hydrogen by reacting with carbon monoxid on water vapors at a temperature of preferably approximately 500° C. in the presence of calcium oxid or equivalent absorbents of carbon dioxid, preferably passing the reacting gases as a counter current against or in contact with a traveling stream of the lime material, preferably proportioning the ratio of the carbon monoxid and water vapors in the ratio of 1:4 or higher, but preferably between the limits of 1:4 and 1:5; in removing the carbonated material and preferably calcining same to eliminate carbon dioxid and in again using the regenerated lime material for carrying out the aforesaid reaction; said lime material preferably containing 5% or so of a catalyst such as iron oxid or manganese oxid preferably in an amorphous form, preferably precipitated on the particles of lime. In the latter case the catalytic material may be added to powdered quicklime by means of an aqueous solution of a salt such as sulfate or acetate of iron or manganese so that precipitation of the catalyst on the particles of lime ensues, thereby securing a very desirable contact and distribution. Preferably an excess of quicklime over that required to completely absorb the carbon dioxid derived from the monoxid is employed. 25–50% excess of calcium oxid may be used as thereby better and more effective conversion is obtained. The gas and vapor passing off at 11 is cooled, water preferably removed by condensation and the gas if desired is further dried in any suitable manner. The removal of the last portions or traces of carbon monoxid or nitrogen may be had by passing the gas over heated calcium carbid.

What I claim is:

1. The herein described process of producing hydrogen-containing gases which comprises passing a mixture comprising a carbon-containing gas and steam, in proportions equivalent to about four to five times as much steam as would correspond to the production of $CO_2$ and hydrogen into contact with a material comprising lime and about 5% of a catalytically active metal oxid, while maintained at a temperature of about 500 to 550° C.

2. The process of making hydrogen which comprises passing a mixture of 1 volume of carbon monoxid with at least 4 volumes of water vapor as a counter current in contact with an oppositely traveling mass of quick lime admixed with about 5% of a catalyst and heated to a temperature of about 500° C.

3. The process of making hydrogen which comprises mixing a carbon monoxid-containing gas with water vapor so as to give a proportion of said monoxid to said water vapor of between 1:4 and 1:5, in passing said mixture as a counter current and in intimate contact with a traveling stream of quick lime material in a finely divided condition and admixed with catalytic material comprising a metallic oxid, and in maintaining the temperature of the reacting materials at approximately 500° C.; whereby said carbon monoxid is substantially converted into carbon dioxid and unites with the quick lime material to form carbonate of lime.

4. The process of making hydrogen which comprises passing a carbon monoxid-containing gas substantially free from nitrogen in the presence of water vapor into contact with a nearly horizontal moving body of a carbon dioxid absorbent and catalytic material maintained at a reacting temperature; in collecting the hydrogen formed, and in substantially freeing the same from water vapor.

5. The process of making hydrogen which comprises passing a carbon monoxid-containing gas in the presence of water vapor into contact with a moving body of a carbon dioxid absorbent and precipitated catalytic material maintained at a reacting temperature; in collecting the hydrogen formed, and in substantially freeing the same from water vapor.

6. The process of making hydrogen which comprises passing a carbon monoxid-containing gas in the presence of a material excess of water vapor into contact with a nearly horizontal moving body of a carbon dioxid absorbent in excess and catalytic material maintained at a reacting temperature; in collecting the hydrogen formed, and in substantially freeing the same from water vapor.

7. The process of making gases containing hydrogen which comprises passing a carbon monoxid-containing gas in the presence of water vapor into contact with a moving body of a carbon dioxid absorbent and catalytic material maintained at a reacting temperature.

8. A process of producing gases containing free hydrogen which comprises passing a mixture comprising a carbon containing gas having reducing properties and steam, in such proportions as to correspond to a material excess of steam over the quantity theoretically necessary for the production of a gas mixture consisting essentially of carbon dioxid and hydrogen, in contact with a material comprising lime and a catalytically active metal oxid, while said material is maintained at a temperature of approximately 500 to 550° C.

9. A process of producing gases containing hydrogen which comprises passing a mixture comprising carbon monoxid and steam in substantially the proportions of 4 to 5 molecules of steam to 1 molecule of carbon monoxid into contact with a material comprising lime and iron oxid, while maintaining said material at a temperature of about 500 to 550° C.

Signed at Montclair, in the county of Essex and State of New Jersey, this 3rd day of June, A. D. 1913.

CARLETON ELLIS.

Witnesses:
   B. M. ELLIS,
   F. CARBUTT.